United States Patent

Hogg et al.

Patent Number: 5,414,405
Date of Patent: May 9, 1995

[54] PERSONNEL IDENTIFICATION DEVICES

[75] Inventors: Robin I. T. Hogg, London; Geoffrey S. Edwards, Cumbria, both of England

[73] Assignees: Colebrand Limited, London; Oxley Developments Company Limited, Cumbria, both of England

[21] Appl. No.: 16,083

[22] Filed: Feb. 10, 1993

[30] Foreign Application Priority Data

Mar. 7, 1992 [GB] United Kingdom ............... 9205052
Jun. 24, 1992 [GB] United Kingdom ............... 9213390
Dec. 11, 1992 [GB] United Kingdom ............... 9225946

[51] Int. Cl.6 .......................... G08B 1/00; G08B 5/22
[52] U.S. Cl. .......................... 340/321; 116/209
[58] Field of Search ............... 116/202, 209; 340/321, 340/331, 573, 947, 953

[56] References Cited

U.S. PATENT DOCUMENTS

| | | | |
|---|---|---|---|
| 3,944,803 | 3/1976 | Chao | 340/331 X |
| 4,074,252 | 2/1978 | Keller | 340/331 X |
| 4,275,385 | 6/1981 | White | 340/312 |
| 4,665,568 | 5/1987 | Stutes | 2/209 |
| 4,837,568 | 6/1989 | Snaper | 340/825.54 |
| 4,985,813 | 1/1991 | Putman | 340/321 X |
| 5,117,766 | 6/1992 | Nechushtan et al. | 116/209 |
| 5,132,659 | 7/1992 | Kuo | 340/321 X |
| 5,175,528 | 12/1992 | Choi et al. | 362/800 X |
| 5,201,578 | 4/1993 | Westmoland | 362/800 X |
| 5,225,828 | 7/1993 | Walleston | 340/953 |

FOREIGN PATENT DOCUMENTS

| | | | |
|---|---|---|---|
| 0073644 | 3/1983 | European Pat. Off. | |
| 755777 | 11/1933 | France | 340/321 |
| 3323698 | 1/1985 | Germany | |
| 4136839 | 5/1993 | Germany | 340/331 |
| 2230365 | 10/1990 | United Kingdom | |

Primary Examiner—William A. Cuchlinski, Jr.
Assistant Examiner—Willie Morris Worth
Attorney, Agent, or Firm—Bernard L. Kleinke; Jerry R. Potts

[57] ABSTRACT

An identification device comprising an IR LED contained within a housing which is adapted to be carried externally by a person or object who or which is to be identifiable in dark conditions. In cases where the device is to be used as a personnel identification beacon (PIB) the housing can carry means to enable it to have a "stick-on" capability whereby the housing can be easily attached or detached to/from the external clothing of a wearer. The IR LED can be adapted to flash and this can be in a coded sequence to enable the particular wearer to be identified.

4 Claims, 1 Drawing Sheet

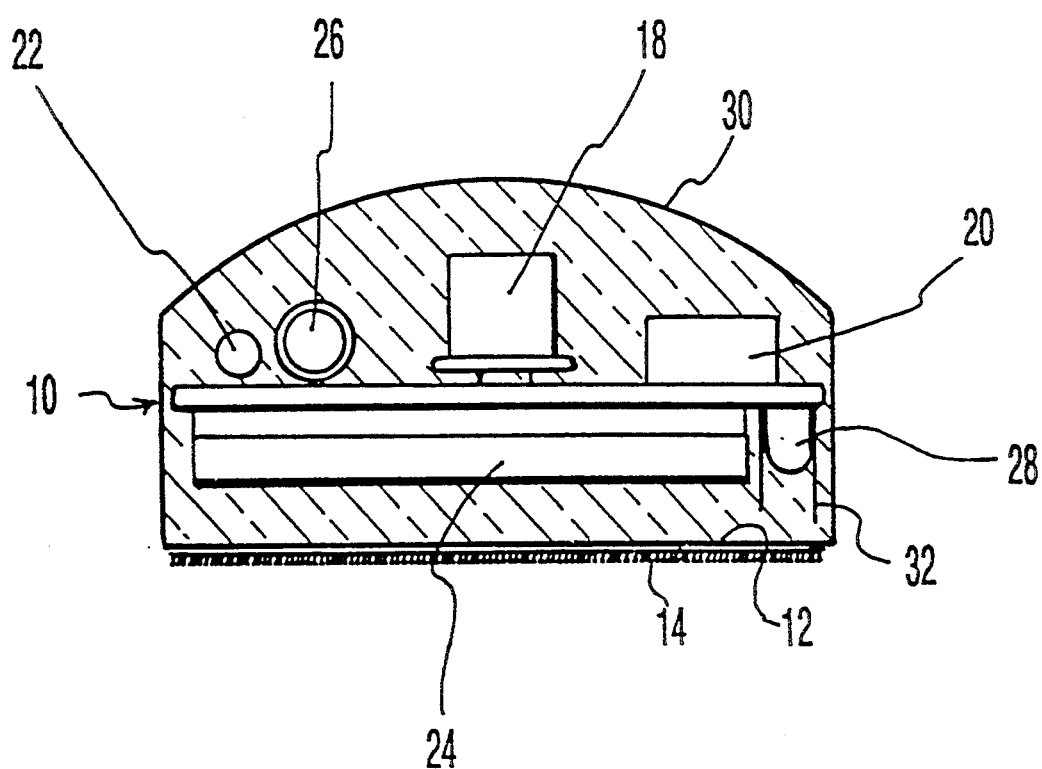

PERSONNEL IDENTIFICATION DEVICES

The present invention relates to devices by which personnel or objects can be identified, particularly at night in dark conditions.

Due to the ready availability of infra red detection equipment such as night vision goggles (NVG), covert security operations at night are often advantageously conducted from observation posts such as helicopters where there is a need to be able to identify friend from foe or the criminals from the police. In particular the images in the NVG or other IR night vision devices are inevitably shadowy because of the low levels of light available to them. Normally friend cannot be readily distinguished from foe.

It is an object of the present invention to provide a means of identifying personnel or objects, such as vehicles, to enable, for example, friend and foe to be distinguishable.

In accordance with the present invention, an identification device comprises an IR LED contained within a housing which is adapted to be carried externally by a person or other object who or which is to be identifiable in dark conditions.

Preferably, the housing carries means enabling it to have a "stick-on" capability, for example a Velcro or flexible magnetic strip on a base portion. By this means, the housing can easily be attached/detached to the external clothing or epaulettes of a wearer for personnel identification purposes, or to a metal object, such as a vehicle.

The IR LED is preferably adapted to flash. The flashing rate can preferably be set at a (secret) rate for a particular operation.

Advantageously, the top of the housing from which the IR LED irradiates is curved, for example in the form of a sector of a sphere.

The device as a whole is preferably fully waterproof and this can be guaranteed by using a magnet which can be selectively fitted externally into a hole in the housing to actuate an internally mounted reed switch to disconnect or connect (preferably disconnect) a battery power supply located within the housing.

The housing is preferably a resilient plastics moulded device having IR transparency to allow light from the IR LED out and switching circuitry (e.g. a standard electronic timer) moulded into the resilient plastics material.

In a preferred embodiment, a visible LED can be disposed in series with the IR LED but is arranged to illuminate only a small portion of the base of the housing (e.g. through a hole in the Velcro). The purpose of this visible LED is to provide comfort to the user that his IR beacon is working, without the need for him to resort to the use of night vision goggles and yet maintain his cover at night. To this end, the visible LED can be positioned in a black tube to limit the viewing angle to straight onto the user.

Thus, in accordance with one aspect of the present invention, advantage is taken of the miniature size of IR LED'S, their relatively low power consumption and special switching circuitry to provide a stick-on IR beacon for security personnel to wear during the security operation, for example on the shoulder, to be visible from above with a wide viewing angle when using night vision devices at night.

As mentioned hereinbefore, the IR LED can be adapted to flash at a (secret) rate or sequence for a particular operation and can be adapted to be fitted to a metal object, such as a vehicle.

Military aircraft are increasingly equipped with infra-red formation lights to enable them to be 'seen' through the aviator's night vision goggles (NVG) under black-out conditions.

In further embodiments of the present invention, the infra-red light is coded and the NVG are adapted so that the coded IR can be detected, decoded and a display activated to give information to the NVG wearer. By this means, information can be given to the NVG wearer to indicate, for example, whether the aircraft carrying such infra-red light is friend or foe, squadron number and the like. The existence of this code is difficult for the (unmodified) enemy's NVG to detect by eye because it is designed as to be too fast for the human eye to respond.

Preferably, the coding of the infra-red light is of a digital nature, for example along the same lines as the remote infra-red control of a T.V.

In other embodiments, the personnel identification beacon (PIB) infra-red emissions may also be coded and again detected using night vision goggles (NVG).

In one arrangement, for example, the programme that determines the digital code in the PIB or formation can be pre-programmed by an inductive technique in a similar way to the tuner or volume controls of a TV or indeed the remotely IR operated lock of a car. This code can also be secretly coded for covert missions or for the authorities to identify goods in transit.

There are increasingly sensitive radio receivers being used to detect the existence of electromagnetic signals in security situations. The use of an IR signal from a PIB modulator to transmit audio information for detection by NVG or other IR sensitive device is clearly much less detectable, particularly if the IR light is directional.

An additional use of the PIB is to suspend it inside a tethered balloon which is only filled with, for example, helium (from a small capsule) by a person who needs to be rescued (or automatically on hitting the sea, mountain, etc.). The coded PIB is only switched on in this emergency for covert detection by the rescuers with NVG.

Even in civil applications (e.g. mountain rescue) the sensitivity of the NVG to infra-red and the relatively low power of the IR diodes means that the battery is small enough to be lifted in the tethered balloon yet detectable from many miles at night to facilitate the rescue. Rescue from underwater may also be advantageously facilitated, with arrangements being made for the tethered balloon to be released from under water.

The present invention may also be used as an identification device in connection with the marking of animals and birds.

Conventional identification devices such as tags and rings used on animals and birds are passive devices which require observers to record their presence. Active devices which emit signals are preferred, since the signal receiver can be remote and used to detect carriers over a wide range of locations. The receivers can detect the bearing and possibly the distance of the signal emitter and thus locate the carrier of the identification device. If the receiver can only detect the bearing of the emitted signal, two spaced receivers can locate the carrier from the combined detected bearings.

Radio signals can be used, but require antennae which may be bulky. When used on a wild animal, the antenna may soon be pulled or bitten off by the animal. By use of the present invention, an active device can be provided which uses non-radio signals, which need not be subject to the disadvantages outlined above.

According to this aspect of the present invention there is provided an active identification device comprising a casing, means for securing the casing on the body of the wearer and means for transmitting a signal, the signal being in the infrared wavelength range. The transmitting means may comprise infra red LEDs and may include coding means to cause the transmission of coded signals, for example flashing signals. The securing means may include suction cups, strip fasteners for adhering to fur or hair and adhesives. The device also includes a miniature power source, such as a battery.

In one example of the invention, the device is implanted using a conventional veterinary implant gun. It may also be in the form of a dart adapted to be fired at the subject from a remote location. It is not essential for the device to bury itself in the flesh of the animal or bird to be observed, since the device can have a strip fastener which initially locks on to the skin covering (fur, hair, feathers, etc.) of the subject, or a suction cup for locking on to smooth skinned subjects. In either case the fastener or suction cup can be supplemented by an adhesive dispenser, which serves to form a longer-lasting fixing of the device body to the subject; the adhesive may be a cyanoacrylate which forms an almost instant bond with organic materials. The device can also be implanted by hand in some circumstances.

The fastener or suction cup may be formed on a ballistically shaped head of a cylindrical body of metal such as stainless steel. Impact of the fastener or suction cup with the subject is arranged to cause release of the adhesive to make the bond more permanent. The adhesive may be dispensed from the centre of the suction cup when provided.

Within the body is a programmable flashing unit driving one or more high intensity infrared LEDs. The unit is energised before firing at the subject from a safe distance. The resulting signals can be mapped to provide a continuous and enduring record of the movement of the carrier of the device, since it should not be easy for the device to become detached from the subject or damaged by it. The device should not endanger the subject since the wavelength of the emitted signals should not be detected by either predators or the host subject.

In a second example of this aspect of the invention, the device is provided with a light sensor whose output is used to switch on the transmitter at dusk when background infrared radiation is reducing. A solar cell is provided to recharge the battery of the device during the day.

The subject can be observed using infrared viewing device possibly in conjunction with visible light viewing devices, so that the subject can be observed in relation to static objects and so its location can be pinpointed whereas the direction of maximum received infrared signal will only give its bearing. The second aspect of the invention described below suggests a more definite location facility.

The flashing unit may be a CMOS 555 formed with an astable flashing programme. The LED is preferably a high intensity wide angle light source. A magnetic switch using a reed switch inside a sealed operating unit and an external magnet for operating the reed switch may be used for the initial setting up of the device without breaking its seal before the subject is released or before the device is implanted on the subject. A suitable place for location of the device is behind the neck of the bird or animal, where it should not come to the notice of the wearer or other birds or animals.

According to another aspect of the invention there is provided a tracking system comprising a plurality of fixed transmitters which can be arranged in a grid pattern, together with a portable transmitter for carrying by the subject to be tracked. With this aspect of the invention the subject can be tracked by observing the signals transmitted by both the fixed and the portable transmitters to trace the movement of the subject in relation to the fixed transmitters. The transmitters preferably operate in the infrared range of wavelengths and the portable transmitter may be of the type proposed in the first aspect of this invention.

In an example of this aspect of the invention, the fixed transmitters are battery powered and are mounted on stakes which are driven into the ground at accurately surveyed positions on a grid. Each fixed transmitter comprises a programmable infrared transmitter and all work at the same wavelength. A CCTV camera or image intensifier observes the area and detects the signals from the fixed transmitters as well as the signals from an identification device as described above. The information recorder can be used to provide a display of a geographically accurate grid of an area of biological interest and a minute-by-minute accurate position of animals being observed.

The invention is now described further, by way of example only, with reference to the accompanying drawing, which is a diagrammatic sectional view through one embodiment of a personnel identification device in accordance with the present invention.

The illustrated device comprises a light-weight housing 10 having a flat base 12. The base 12 is adapted to be fitted in an easily attachable/detachable manner to the external clothing of a person, for example by means of a Velcro strip 14. An alternative to Velcro could be a strip of magnetic material so that the device can be fixed to a vehicle or other metal object.

Disposed within the housing 10 on a circuit board 16 are an infra red LED emitter 18, switching circuitry 20 by which the LED emitter 18 can be flashed at a controlled rate or sequence, a reed switch 22 and a battery 24. A detented tubular hole or recess in the housing enables a cylindrical magnet 26 to be introduced into the vicinity of the reed switch without disturbing the integrity of the housing 10. Operation of the reed switch 22 by the magnet can be arranged either to connect or (preferably) disconnect the battery power to the other components.

Also disposed in the housing 10 is a visible LED 28 which can be viewed only by way of an opening in the base 12 of the housing. The LED 28 is wired in series with the IR LED 18 so that it is energised only when the IR LED 18 is itself energised and operational. Preferably, the LED 28 is contained at one end of a black tube 32 to limit the viewing angle to straight onto the viewer.

In the illustrated embodiment, the top surface 30 of the housing is curved, preferably in the form of a sector of a sphere.

As will be evident, the presence of such devices can be readily detected, for example from a helicopter or other observation post, using a suitable IR detector, such as night vision glasses/goggles or other IR night vision devices. It can thus be easily seen whether any particular person is authorised (friend) or unauthorised (foe).

Another use of the present device is in the identification of birds or animals whose location is to be identified from a remote position, sometimes under dark conditions. Such birds or animals can be arranged to be fitted, e.g. by superglue, with a small IR transmitter as described hereinbefore. The IR output can be coded to distinguish the bird or animal individually and/or to indicate its sex.

We claim:

1. A device for an object to be identified in the dark, comprising:
   a waterproof housing;
   means for enabling the housing to be secured removably to the object to be identified in the dark;
   at least one infrared light emitting diode disposed within the housing for emitting infrared light to be detected for object identification purposes, said housing having an infrared transparency portion to enable said infrared light to be emitted therethrough;
   a reed switch for causing said infrared light emitting diode to be actuated on and off;
   a battery for electrically energizing the infrared light emitting diode through said reed switch;
   said infrared light emitting diode, said reed switch and said battery all being disposed within said waterproof housing;
   a magnet; and
   mounting means recessed into said waterproof housing without perforating it for receiving said magnet;
   wherein said mounting means enables said magnet to be placed in the vicinity of said reed switch for activating the reed switch to cause said infrared light emitting diode to be coupled to the battery for electrical energizing purposes.

2. An identification device for identification of a wearer in dark conditions, comprising:
   a waterproof housing having a base and an infrared transparency portion;
   attachment means for enabling the housing to be attached externally removably to a garment worn by the wearer;
   at least one infrared light emitting diode disposed within the housing at the transparency portion thereof;
   switching means including timer means disposed within the housing for enabling said at least one infrared light emitting diode to be actuated on and off at a predetermined rate and sequence;
   battery means within the housing for electrically energizing said at least one infrared light emitting diode via said switching means;
   wherein said attachment means is stick-on means to attach removably said housing to the garment worn by the user;
   wherein said switching means further includes a reed switch for activating said timer means;
   said battery means and said reed switch being contained within said waterproof housing;
   a magnet; and
   mounting means recessed into said waterproof housing for receiving said magnet without perforating said housing for controlling the on and off actuation of said reed switch.

3. An identification device according to claim 2, wherein said housing is molded from a resilient plastic material and the infrared transparency portion thereof permits infrared light to be emitted therethrough; and
   said switching means being molded into the housing.

4. An identification device according to claim 3, wherein a visible light emitting diode is wired in series with the infrared light emitting diode but is arranged to illuminate only a small portion of the base of the housing;
   whereby the wearer of the device can determine by inspection of the visible light emitting diode that the device is working, without the need for the wearer to resort to the use of an infrared sensitive viewing device.

* * * * *